June 29, 1954     R. L. MILLER     2,682,274
FLUID INFLATABLE CORRIDOR

Filed March 17, 1951     3 Sheets-Sheet 1

*INVENTOR.*
RALPH L. MILLER
BY
*R. L. Miller*
ATTORNEY

June 29, 1954 R. L. MILLER 2,682,274
FLUID INFLATABLE CORRIDOR
Filed March 17, 1951 3 Sheets-Sheet 3

INVENTOR.
RALPH L. MILLER
BY
*R. L. Miller*
ATTORNEY

Patented June 29, 1954

2,682,274

UNITED STATES PATENT OFFICE 2,682,274

FLUID INFLATABLE CORRIDOR

Ralph L. Miller, Akron, Ohio, assignor, by mesne assignments, to The Goodyear Tire & Rubber Company, a corporation of Ohio Application March 17, 1951, Serial No. 216,215

8 Claims. (Cl. 135—5)

The present invention relates to a form of fluid inflatable corridor for interconnecting the openings in a storage building or warehouse and a vehicle during loading and unloading operations. More particularly, the invention pertains to a form of connecting passageway by means of which the door of a warehouse and the door of a refrigerator vehicle may be interconnected to prevent dissipation of the cooling media.

Whenever it is necessary to move stock into or out of a storage warehouse where the temperature is maintained at low levels by refrigeration, the opening of the doors will soon raise the temperature many degrees and create an extra load on the cooling plant. Likewise, the opening of the doors of a refrigerator car or truck will materially affect the temperatures therein in a very short period of time.

The present invention contemplates a double walled frame, corridor or passageway which may advantageously be mounted on the outer wall of the warehouse encompassing the doorway for temporary connection with the wall of the vehicle when the chambers formed between the walls are inflated with fluid under pressure. This serves as a very satisfactory means of sealing the space between openings in the building and the vehicle so that all stock may be moved across a conventional bridge or gangplank extending therebetween and completely enclosed within the corridor.

It is, therefore, an object of the present invention to provide a means for satisfactorily interconnecting the doorways or other openings in the walls of a warehouse and a vehicle during the loading or unloading of the same.

Other important features and advantages of applicant's inventive concept will become apparent as the following description of certain typical forms of the structure proceeds.

Figure 1:
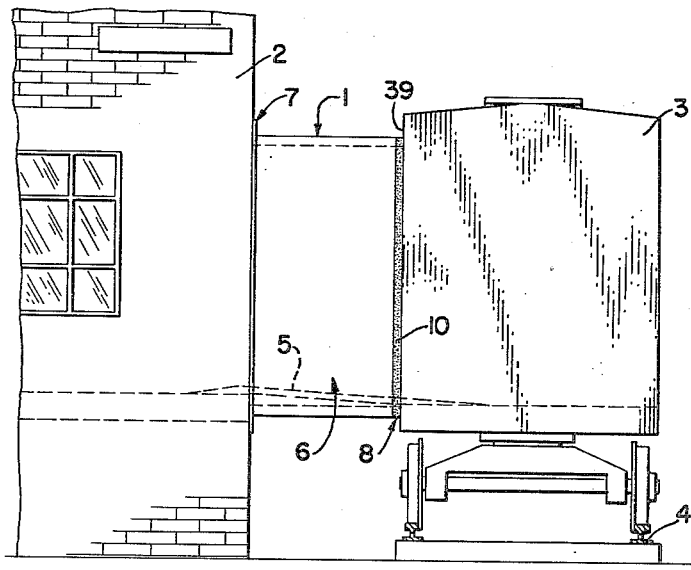

In the drawings, Fig. 1 illustrates a refrigerator car and a warehouse with a form of connecting corridor embodying the invention disposed therebetween. Fig. 2 is a perspective view of one form of corridor. Figs. 3, 4, 5 and 6 illustrate various details of construction including mounting means and sealing members and the like. Fig. 7 shows an alternative construction for the corridor.

In Fig. 1, the reference character 1 identifies generally the fluid inflatable corridor, or passageway connecting a doorway (not shown) in the building 2 with a doorway (not shown) in the refrigerator car 3 spotted on a railroad siding 4. The corridor 1 is normally secured permanently to the outer wall of the building 2 in a manner more fully described hereinafter. When the corridor 1 is inflated and extended to the car 3, the bridge or gangplank 5 is placed between the two doorways and the loading or unloading operation is conducted wholly within the interior of the corridor 1.

The corridor 1 may be constructed of any suitable length sufficient to extend from the building 2 to the car 3. The corridor 1 embodies a frame or conduit 6, a mounting means 7 at one end thereof for mounting the unit on the building 2 and a temporary attachment 8 in the form of detachable fastenings or tie cords 9 in cooperation with a sealing element or gasket 10.

The corridor 1 may assume any one of several different forms, the most advantageous being that embodying a two-ply fabric 11 of the type shown in Figs. 3, 4, 5 and 6 representing sections taken normal to the plane of the walls. The two-ply fabric 11 has a first ply 12 and a second ply 13 which are constructed in superposed relation to each other with a multiplicity of substantially inextensible tie threads 14 of predetermined length woven interconnecting the fabric plies 12 and 13. The inextensible tie threads 14 extend between the plies 12 and 13 and are alternately woven into the plies 12 and 13 respectively. In one fabric of this type, the tie thread is woven into one of the plies for a short distance then dropped down to the other ply and woven into that ply a short distance and then back up to the original ply so that the tie threads in reality are formed of a relatively long thread that is alternately woven into the two fabric plies to maintain the plies in substantially parallel relation when the tie threads are extended. When the ends of the fabric 11 are properly sealed and the chamber 15 between the fabric plies 12 and 13 is filled with fluid under pressure introduced thereto by means of a port or valve 16, the corridor 1 will assume the shape illustrated in Fig. 2 and the fabric 11 will appear as shown in Figs. 3, 4, 5 and 6.

Figures 3, 4:
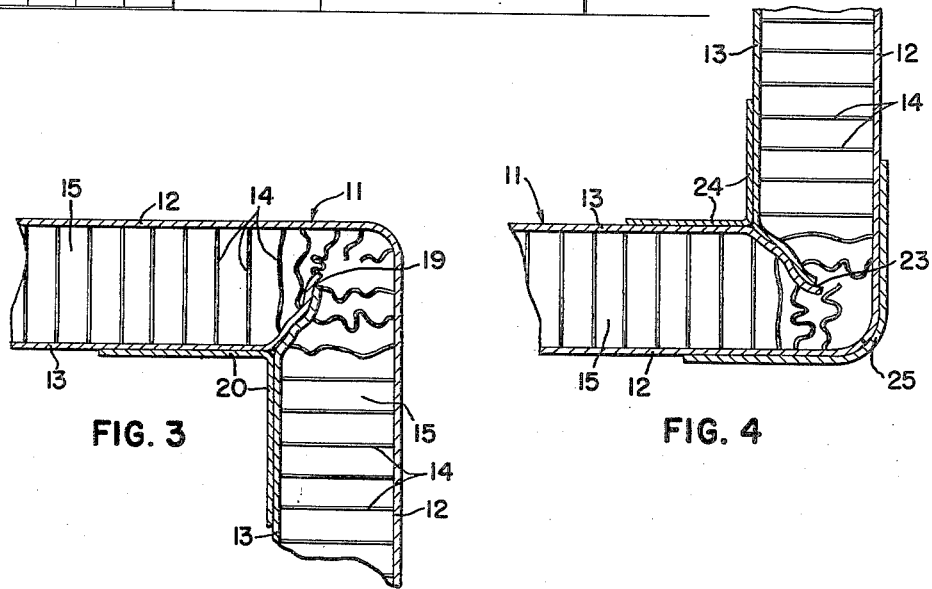

In the fabrication of the fabric 11 into the generally tubular construction shown in Fig. 2, the opposed corners 17 and 18 are produced as shown in Fig. 3. The ply 13 is cut at 19 and the excess portions are folded inwardly and a reinforcing strip or tape 20 is applied thereby producing the finished corner. Similarly, the opposed corners 21 and 22 are formed by cutting the ply 13 as at 23, affixing the reinforcing strip or tape 24 and the additional reinforcement 25 externally. Thus the chamber 15 in the corridor 1 formed from the fabric 11 is continuous throughout the structure.

It will be readily understood that the chamber 15 may be formed in segments, if desired, to provide greater strength. This can be accomplished by introducing one or more partitions (not shown) internally of the fabric 11, if such an arrangement is desired. In such case, more than one valve 16 will be required to accomplish the inflation of the structure. More than one such valve may be used in any event.

Figure 6:
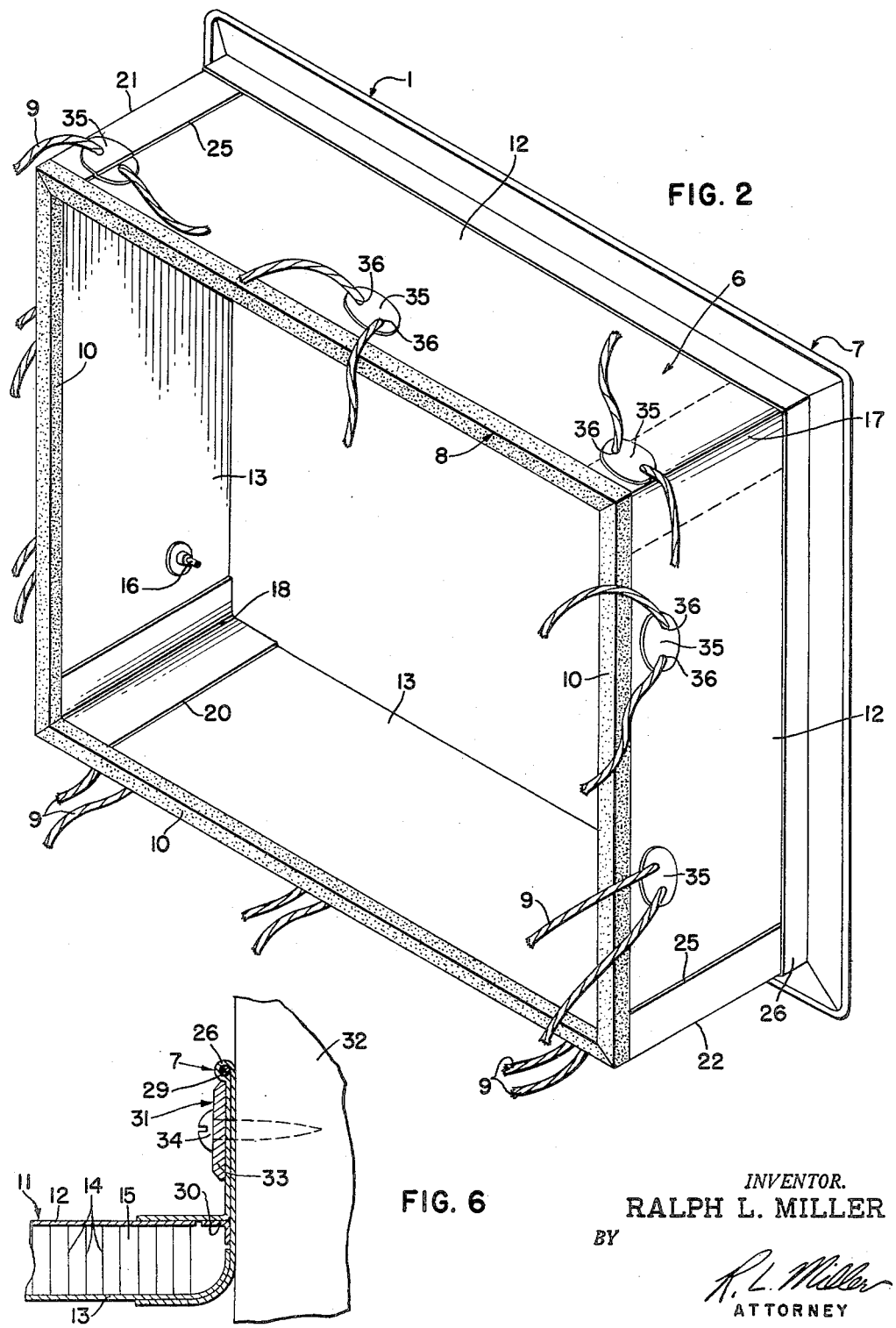
Figure 7:
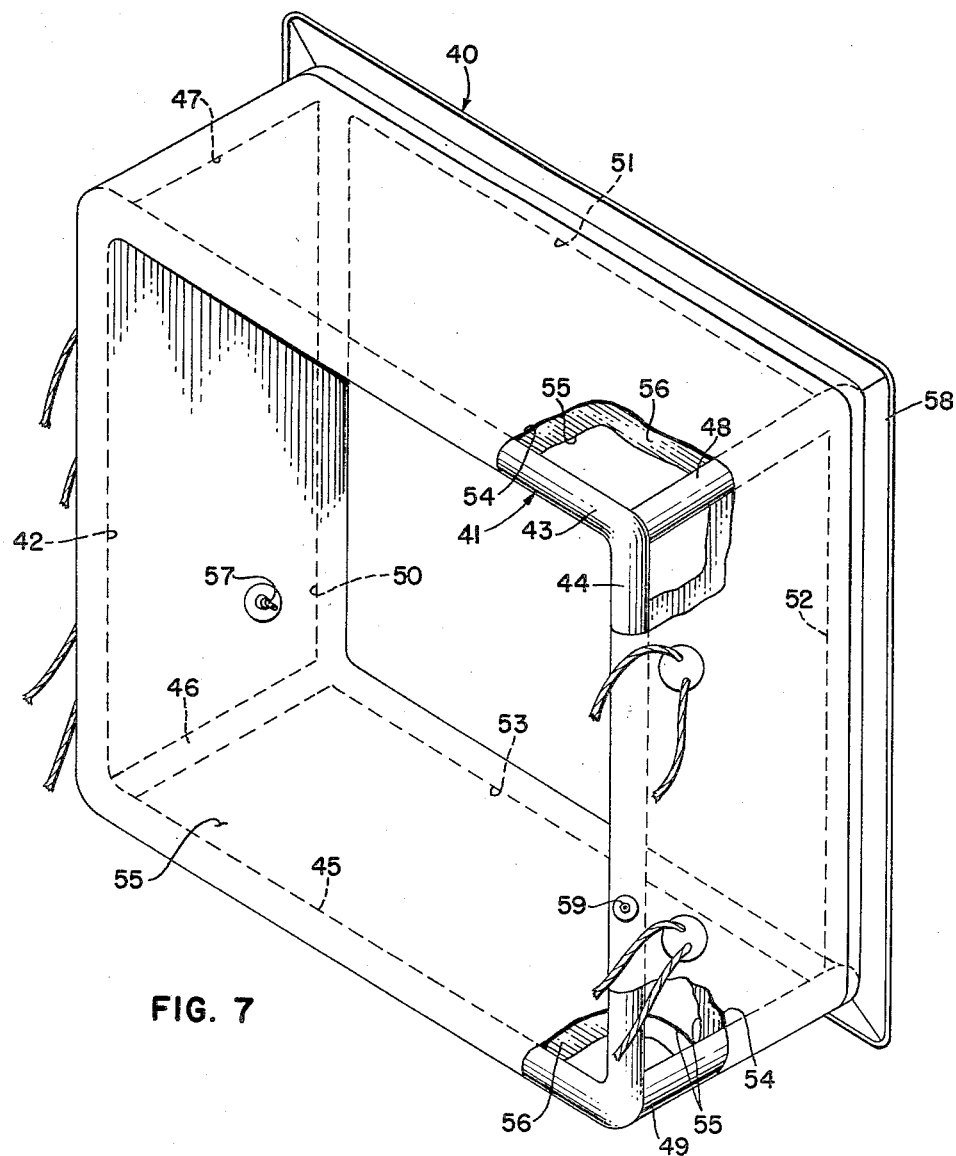

The mounting means 7 comprises a fabric strip or flap 26 which is secured to the outermost surface of the ply 13 of the fabric 11 as shown in Fig. 6, doubled over a rope or cable 29 and bonded to the outermost surface of ply 12. The flap 26 extends, as shown in Fig. 2, completely around the entire circumferential dimension of the one end of the corridor 1 and forms a flange for securing the same to the building 2. A crotch tape reinforcement 30 is applied to the junction of the doubled portions of the flap 26 to seal the edge of the chamber 15 and to reinforce the mounting means 7.

Any suitable form of anchoring device 31 may be employed to attach the flap 26 to the wall 32 of the building 2. One form of anchoring device 31 which is highly satisfactory embodies a metal strip 33 apertured at spaced intervals therealong to receive the screws 34 which are screwed into the wall 32 of the building. Many other forms of anchoring devices may be used in place of those described above.

The tie cords 9 of the temporary attachment 8 on corridor 1 are advantageously anchored in place with respect to the fabric 11 by means of the patches 35 adhesively secured to the outermost surface of the ply 12. A pair of holes 36 are punched in each patch 35 to permit the ends of the tie cords 9 to pass therethrough and permit sufficient freedom to tie the same to the fittings (not shown) on the car 3.

Figure 5:
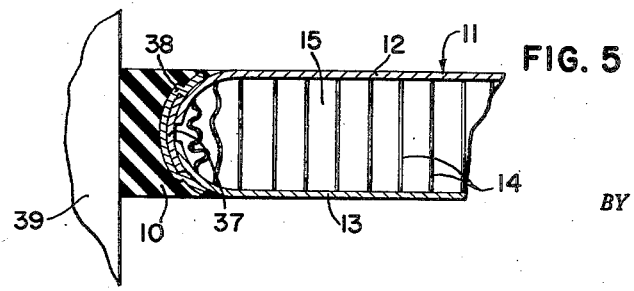

The gasket 10 is adhesively secured to the end of the corridor 1 opposite that on which the mounting means 7 is formed. The plies 12 and 13 of the two-ply fabric 11 are drawn inwardly as shown in Fig. 5, and held in place by the narrow tape or strip 37 of single ply fabric. A wide tape or strip 38 of single ply fabric is applied over the narrow strip 37 to provide additional reinforcement for the joint. The gasket 10 which is formed of a resilient rubber is bonded to the exposed surface of the wide strip 38 for contact with the wall 39 of the car 3.

Another form of construction which may be employed for the corridor 1 is illustrated in Fig. 7 and is identified generally by the reference character 40. The corridor 40 embodies a skeleton or frame 41 constructed of a plurality of interconnected tubular elements 42, 43, 44, 45 forming a rectangular shape connected by means of the spacer elements 46, 47, 48, 49 to a second series of tubular elements 50, 51, 52, 53. By reason of the several tubular elements being interconnected as shown, a single inflating valve 59 may be employed to cause the frame 41 to assume its eventual shape.

An outer fabric wall or enclosure 54 completely encloses the frame 41 and is supported thereby. A second internally disposed fabric wall 55 is secured to and supported by the frame 41 thereby producing a double walled structure in which the walls are spaced apart by the several tubular elements comprising the frame. The chamber 56 formed between the two walls 54 and 55 is arranged to be inflated with fluid under pressure with the aid of a port or valve 57. Other additional valves 57 may be added to facilitate the inflation of the frame 41, if desired.

The corridor 40 is provided with a flap 58 which is generally similar in its contruction to the flap 26 of the mounting means 7 of the corridor 1. A rubber gasket (not shown) similar to the gasket 10 may be secured to the face of the tubular elements 42, 43, 44, 45 of the frame 41, if desired, to provide a somewhat better seal with respect to the car 3 when the corridor 40 is in use.

Corridors 1 and 40 are highly advantageous in that they provide a dual walled enclosure for joining together the open doorways of a building and a vehicle and create an ample and totally unobstructed passage between the two. Moreover, the presence of the air chambers 15 and 56 serves to form an insulating medium to prevent the effect of outside temperatures on the building and also on the vehicle.

Wherever used herein, the word "tubular" should be construed in its broadest sense, particularly as employed in the appended claims. The term is ordinarily applied to a pipe-like structure which is generally circular in cross section and of greater axial than cross sectional dimension. The meaning intended here includes a hollow conduit of circular, oval, square or polygonal cross section and a structure in which the axial dimension has no specific relation to the diameter or transverse dimension of the corridor 1.

While certain representative embodiments and details have been shown for the purpose of illustrating the invention, it will be apparent to those skilled in this art that various changes and modifications may be made therein without departing from the spirit or scope of the invention.

I claim:

1. A fluid inflatable corridor comprising a double-walled flexible fabric frame of generally tubular construction having a substantially fluid-impervious coating thereon and defining a fluid-tight chamber between the walls thereof; a mounting member on one end of the frame; fastening means on the opposite end of the frame; and a sealing element on the end of the frame adjacent the fastening means.

2. A fluid inflatable corridor comprising a double-walled flexible fabric frame of generally tubular construction having a substantially fluid-impervious coating thereon and defining a fluid-tight chamber between the walls thereof; means for introducing fluid under pressure to the chamber; a mounting member on one end of the frame; a plurality of fastening means on the opposite end of the frame; and a sealing element on the end of the frame adjacent the fastening means.

3. A fluid inflatable corridor comprising a double-walled flexible fabric frame of generally tubular construction having a substantially fluid-impervious coating thereon and defining a fluid-tight chamber between the walls thereof; a flap extending circumferentially of one end of the frame; anchoring devices for use with the flap; means for introducing fluid under pressure to the chamber; a plurality of tie cords on the opposite end of the frame; and a gasket member secured to the end of the frame adjacent the tie cords.

4. A fluid inflatable corridor for interconnecting the openings of buildings and refrigerator vehicles, said corridor comprising a conduit of double-walled generally tubular construction having a substantially fluid-impervious coating thereon and sealed at the ends thereof to form a fluid-tight chamber defined by a pair of superposed fabric plies interconnected by a plurality of substantially inextensible tie threads of predetermined length extending between the plies to maintain the plies in substantially parallel relation; means on one end of the conduit for securing the same to the building; fastening means on the conduit for temporary attachment to the vehicle; and a sealing element on the end of the conduit connected to the vehicle.

5. A fluid inflatable corridor for interconnecting the openings of buildings and refrigerator vehicles, said corridor comprising a conduit of double-walled generally tubular construction having a substantially fluid-impervious coating thereon and sealed at the ends thereof to form a fluid-tight chamber defined by a pair of superposed fabric plies interconnected by a plurality of substantially inextensible tie threads of predetermined length extending between the plies to maintain the plies in substantially parallel relation; means on the conduit for introducing fluid under pressure to the chamber; a mounting member at one end of the conduit for securing the same to the building and enclosing the opening therein; a plurality of fastening means secured to the conduit adjacent the other end thereof for temporary attachment of that end of the conduit to the vehicle to enclose the opening therein; and a sealing element on the end of the conduit contacting the vehicle.

6. A fluid inflatable corridor for interconnecting the openings of buildings and refrigerator vehicles, said corridor comprising a conduit of double-walled generally tubular construction having a substantially fluid-impervious coating thereon and sealed at the ends thereof to form a fluid-tight chamber defined by a pair of superposed fabric plies interconnected by a plurality of substantially inextensible tie threads of predetermined length extending between the plies to maintain the plies in substantially parallel relation; means on the conduit for introducing fluid under pressure to the chamber; a flap extending circumferentially of an end of the conduit; anchoring devices for securing the flap to the building with the flap arranged to completely encompass the opening therein; a plurality of tie cords secured to the conduit adjacent the other end thereof for temporarily attaching that end of the conduit to the vehicle and substantially completely encompassing the opening therein; and a gasket member on the end of the conduit contacting the vehicle to effect sealing engagement therewith.

7. A fluid inflatable corridor for interconnecting the openings of buildings and refrigerator vehicles, said corridor comprising a flexible fabric frame embodying a plurality of interconnecting generally cylindrical inflatable members; a fabric wall having a fluid-impervious coating thereon disposed on each side of the frame completely enclosing the same and forming therebetween a substantially fluid-tight chamber; a mounting member for securing the frame to the building surrounding the opening therein; fastening means for securing the other end of the frame to the vehicle so as to encompass the opening therein; and a sealing element on the end of the frame connected to the vehicle.

8. A fluid inflatable corridor for interconnecting the openings of buildings and refrigerator vehicles, said corridor comprising a flexible fabric frame embodying a plurality of interconnecting generally cylindrical inflatable members; a fabric wall having a fluid-impervious coating thereon disposed on each side of the frame completely enclosing the same and forming therebetween a substantially fluid-tight chamber; a mounting flap on one end of the frame extending circumferentially thereof; means for securing the flap to the building so as to surround the opening therein; a plurality of tie cords secured to the outermost fabric wall adjacent the other end of the frame for temporarily attaching the same to a vehicle and encompassing the opening therein; and a gasket member extending about the end of the frame contacting the vehicle to effect sealing engagement therewith.

References Cited in the file of this patent

UNITED STATES PATENTS

| Number | Name | Date |
|---|---|---|
| 326,242 | Prosser | Sept. 15, 1885 |
| 468,455 | Giessmann | Feb. 9, 1892 |
| 1,827,427 | Fincher | Oct. 13, 1931 |
| 2,297,150 | Hunter | Sept. 29, 1942 |
| 2,567,995 | Eshnaur | Sept. 18, 1951 |
| 2,591,829 | Katzenmeyer et al. | Apr. 8, 1952 |